(12) United States Patent
Saito

(10) Patent No.: US 11,914,215 B2
(45) Date of Patent: Feb. 27, 2024

(54) IMAGE PICKUP APPARATUS, LENS APPARATUS, AND CAMERA SYSTEM

(71) Applicant: CANON KABUSHIKI KAISHA, Tokyo (JP)

(72) Inventor: Naoki Saito, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 280 days.

(21) Appl. No.: 17/227,633

(22) Filed: Apr. 12, 2021

(65) Prior Publication Data
US 2021/0333502 A1 Oct. 28, 2021

(30) Foreign Application Priority Data
Apr. 27, 2020 (JP) ................. 2020-078160

(51) Int. Cl.
*G02B 7/02* (2021.01)
*G03B 5/02* (2021.01)
*G03B 17/12* (2021.01)

(52) U.S. Cl.
CPC ............ *G02B 7/021* (2013.01); *G03B 5/02* (2013.01); *G03B 17/12* (2013.01); *G03B 2205/0053* (2013.01)

(58) Field of Classification Search
CPC .......... G02B 7/021; G03B 5/02; G03B 17/12; G03B 2205/0053

USPC .............. 359/811, 813, 814, 819, 823, 824; 348/241
See application file for complete search history.

(56) References Cited

U.S. PATENT DOCUMENTS

2020/0007724 A1* 1/2020 Nakagawara .......... H04N 23/55

FOREIGN PATENT DOCUMENTS

| JP | H10133246 A | 5/1998 |
|---|---|---|
| JP | 2011221519 A | 11/2011 |
| JP | 2013077915 A | 4/2013 |
| JP | 2013161061 A | 8/2013 |
| JP | 2017034568 A * | 2/2017 |
| JP | 2017085438 A * | 5/2017 |
| JP | 2017139689 A | 8/2017 |
| JP | 2020003723 A | 1/2020 |
| WO | 2012131794 A1 | 10/2012 |

* cited by examiner

*Primary Examiner* — William Choi
(74) *Attorney, Agent, or Firm* — ROSSI, KIMMS & McDOWELL LLP (57) ABSTRACT

An image pickup apparatus communicably mountable with a lens apparatus including a driver configured to drive a driven member includes an acquirer configured to acquire information on a noise source, and a determiner configured to determine a control over the driver using the information on the noise source.

17 Claims, 8 Drawing Sheets

| NOISE LEVEL | SWITCHING DISTANCE CONDITION TO NOISE REDUCTION CONTROL |
|---|---|
| 1 | DISTANCE INFORMATION: 50 mm OR LESS |
| 2 | DISTANCE INFORMATION: 100 mm OR LESS |
| 3 | DISTANCE INFORMATION: 150 mm OR LESS |

IMAGE PICKUP APPARATUS, LENS APPARATUS, AND CAMERA SYSTEM

BACKGROUND OF THE INVENTION

Field of the Invention

The present invention relates to an image pickup apparatus, a lens apparatus, and a camera system.

Description of the Related Art

A pulse width modulation ("PMW") control method (digital control method) and a linear control method (DC control method, analog control method) have been known as methods for controlling driving of an actuator. The PMW control method is effective for power saving but is likely noisy. When the generated noise is superimposed on an imaging signal, the image quality deteriorates.

Japanese Patent Laid-Open No. ("JP") 10-133246 discloses an apparatus using a linear control method during exposure so as to suppress noises because an imaging signal is read out and a PWM control method during non-exposure because no imaging signal is read out.

Since the apparatus in JP 10-133246 necessarily uses the linear control method having a larger power loss than that of the PWM control method during exposure, the suppliable power is limited and the actuator may not be able to be properly driven.

SUMMARY OF THE INVENTION

The present invention provides a lens apparatus, an image pickup apparatus, and a camera system, each of which can reduce noises caused by driving an actuator and can properly drive the actuator.

An image pickup apparatus according to one aspect of the present invention communicably mountable with a lens apparatus including a driver configured to drive a driven member includes an acquirer configured to acquire information on a noise source, and a determiner configured to determine a control over the driver using the information on the noise source.

A lens apparatus according to another aspect of the present invention communicably mountable on an image pickup apparatus includes a driver configured to drive a driven member, a transmitter configured to transmit information on the lens apparatus to the image pickup apparatus, and a controller configured to control driving of the driver using an instruction from the image pickup apparatus on a control over the driver based on information on a noise source.

A camera system including the above image pickup apparatus and the lens apparatus also constitutes another aspect of the present invention.

Further features of the present invention will become apparent from the following description of exemplary embodiments with reference to the attached drawings.

DESCRIPTION OF THE EMBODIMENTS

Referring now to the accompanying drawings, a detailed description will be given of embodiments according to the present invention. Corresponding elements in respective figures will be designated by the same reference numerals, and a duplicate description thereof will be omitted.

First Embodiment

Figure 1:
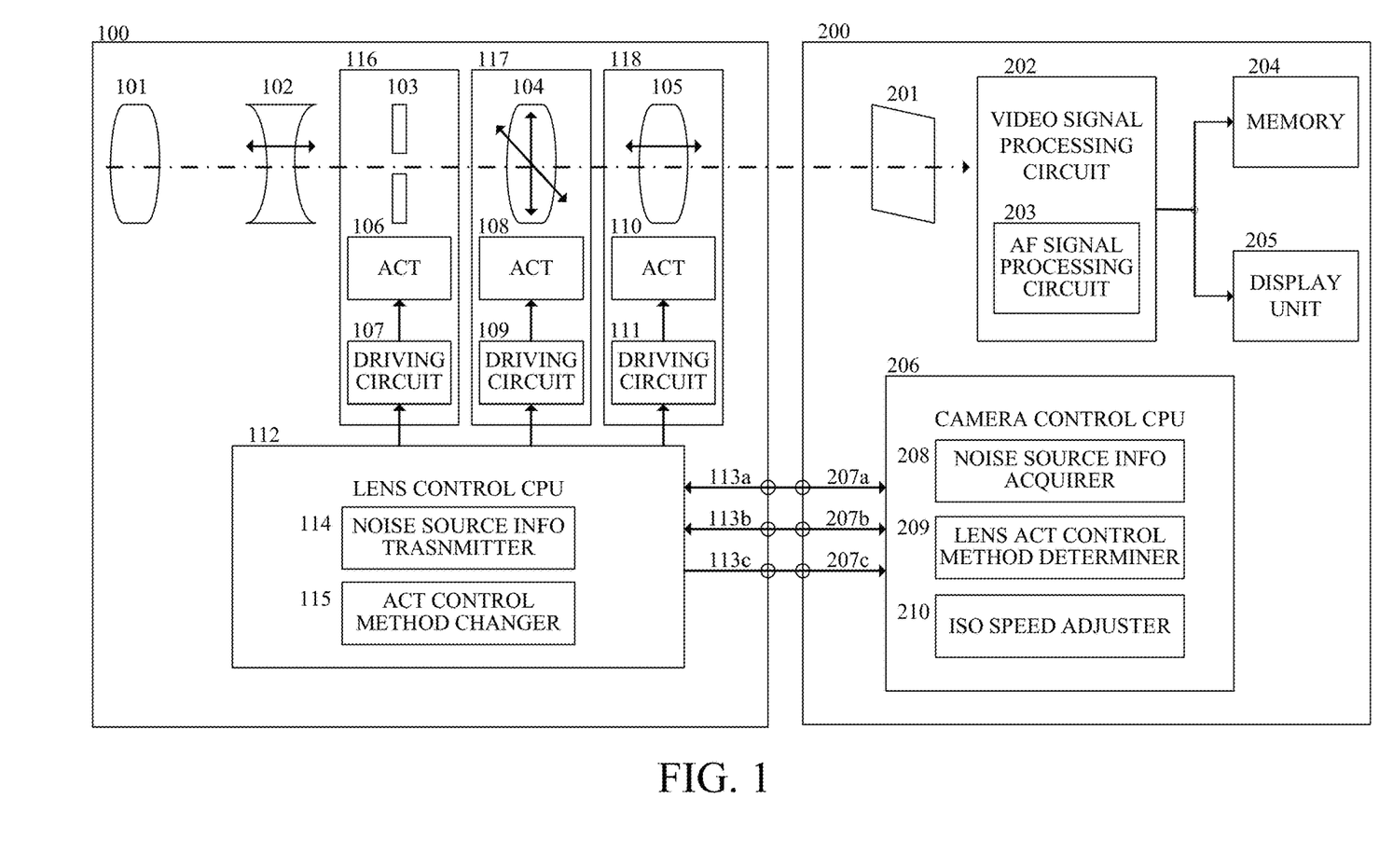
FIG. 1 is a configuration diagram of a camera system according to a first embodiment.

FIG. 1 is a configuration diagram of a camera system according to this embodiment. The camera system includes a lens apparatus (interchangeable lens hereinafter) 100 and an image pickup apparatus (camera body hereinafter) 200 detachably and communicably attached to the interchangeable lens 100. The present invention is applicable not only to an interchangeable lens type camera system but also to a lens integrated image pickup apparatus (digital still camera, video camera, etc.).

In the interchangeable lens 100, an imaging optical system includes, in order from an object side to an image side, a fixed front lens 101, a magnification varying lens 102, a diaphragm (aperture stop) 103, an image stabilizing lens 104, and a focus lens 105. In FIG. 1, each lens includes one lens element, but actually includes one or more lens elements.

The magnification varying lens 102 moves in an optical axis direction when an unillustrated zoom ring is rotated and a cam ring is rotated. By changing a distance between adjacent lens units, an image can be captured at a focal length from a wide-angle end to a telephoto end. A rotating operation amount of the zoom ring is detected by an unillustrated sensor. The magnification varying lens 102 may move in the optical axis direction during the magnification variation as the zoom actuator includes a stepping motor, a DC motor, or the like is driven.

The aperture diameter of the diaphragm (driven member) 103 can be changed as a diaphragm actuator (driver) 106 including a stepping motor, a DC motor, or the like is driven. A diaphragm driving circuit 107 supplies a driving voltage and current to a diaphragm actuator 106. A light amount adjuster 116 includes the diaphragm 103, the diaphragm actuator 106, and the diaphragm driving circuit 107.

The image stabilizing lens (driven member) 104 moves in a shift direction to provide the image stabilization when an image stabilizing actuator (driver) 108 including a stepping motor, a voice coil motor, or the like is driven. An image stabilization driving circuit 109 supplies a driving voltage and current to an image stabilizing actuator 108. An image stabilizer 117 includes the image stabilizing lens 104, the image stabilizing actuator 108, and the image stabilization driving circuit 109.

The focus lens (driven member) 105 moves in the optical axis direction to provide focusing when the focus actuator (driver) 110 including a stepping motor, a voice coil motor, an ultrasonic motor, and the like is driven. A focus driving circuit 111 supplies a drive voltage and current to the focus actuator 110. A focusing unit 118 includes the focus lens 105, the focus actuator 110, and the focus driving circuit 111.

When the interchangeable lens 100 is mounted on the camera body 200, electrical contacts 113a, 113b, and 113c provided on the interchangeable lens 100 are connected to electrical contacts 207a, 207b, 207c provided on the camera body 200, respectively. Thereby, various information can be communicated between the interchangeable lens 100 and the camera body 200. FIG. 1 illustrates the three-wire serial communication, but the present invention is not limited to this example. In this embodiment, a lens control CPU 112 and a camera control CPU 206 perform a serial communication using the camera control CPU 206 as a clock master.

An unillustrated power supply contact provided on the interchangeable lens 100 and an unillustrated power supply contact provided on the camera body 200 are connected to each other. Thereby, the electric power from an unillustrated secondary battery such as a lithium ion battery mounted on the camera body 200 is converted into a desired voltage by a power supply circuit such as a DC-DC converter, and supplied to various sensors, the lens control CPU 112, and various driving circuits in the interchangeable lens 100.

The camera body 200 includes an image sensor 201 as a photoelectric conversion element, such as a CCD sensor and a CMOS sensor. The image sensor 201 photoelectrically converts an optical image (object image) formed on the imaging plane by the imaging optical system. The electric charges accumulated in the image sensor 201 by the photoelectric conversion are output as an imaging signal (analog signal) at a predetermined timing and input to a video signal processing circuit 202.

A video signal processing circuit 202 converts the analog signal from the image sensor 201 into a digital signal, and performs various signal processing, such as an amplification and a gamma correction, for the digital signal to generate a video signal. The video signal is output to a camera control CPU 206, a display unit 205 including a liquid crystal display panel and the like, and a memory 204 such as an optical disc, a semiconductor memory, and the like.

The video signal processing circuit 202 includes an AF signal processing circuit 203 as a focus information generator. The AF signal processing circuit 203 extracts a high-frequency component or a luminance component obtained from a pixel group in the AF area, which is a focus detecting area, from an imaging signal (or a video signal generated by using the imaging signal) output from the image sensor 201 and generates a focus evaluation value signal as focus information. The focus evaluation value signal indicates a contrast state (imaging contrast) of the video, that is, the sharpness, and changes as the focus lens 105 moves. The value of the focus evaluation value signal, that is, the focus position where the focus evaluation value is maximum (peak) is an in-focus position in the AF area.

An ISO speed adjuster 210 is mounted in the camera control CPU 206 and mainly determines the ISO speed. The ISO speed adjuster 210 determines the ISO speed based on the output value from an unillustrated photometric unit (AE) that measures a light amount received from the object.

The lens control CPU 112 includes a noise source information transmitter 114 and an actuator ("ACT") control method changer (controller) 115. The noise source information transmitter 114 communicates with the camera control CPU 206 via the electrical contacts 113a to 113c and 207a to 207c. The ACT control method changer 115 changes the control method for various actuators included in the interchangeable lens 100 according to an instruction from the camera control CPU 206.

The camera control CPU 206 includes a noise source information acquirer (acquiring unit) 208 and a lens ACT control method determiner (determining unit) 209. The noise source information acquirer 208 acquires information (noise source information) on the noise source transmitted from the noise source information transmitter 114 via the electrical contacts 113a to 113c and 207a to 207c. The lens ACT control method determiner 209 determines the control method for various actuators included in the interchangeable lens 100 by using the noise source information. In this embodiment, the noise source information acquirer 208 acquires the noise source information directly from the interchangeable lens 100, but the present invention is not limited to this example. The noise source information acquirer 208 may acquire the identification ("ID") information of the interchangeable lens 100 from the interchangeable lens 100 and the noise source information corresponding to the ID information from an external device, such as an unillustrated memory provided in the camera body 200 and a server, which stores the noise source information.

The various actuators included in the interchangeable lens 100 are drivable by two control methods, a PWM control method and a linear control method. In this embodiment, the ACT control method changer 115 changes the control method based on the control method determined by the lens ACT control method determiner 209.

Figure 2:
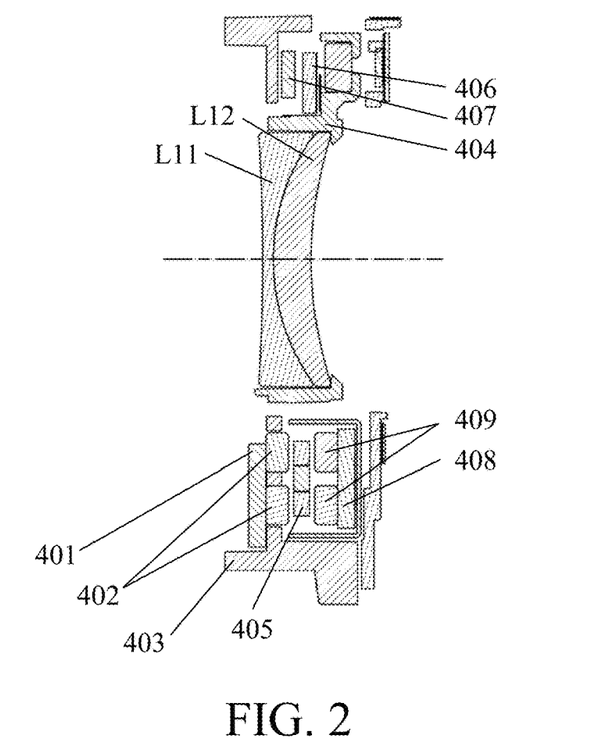
FIG. 2 is a sectional view of an image stabilizer according to the first embodiment.

The configuration of the image stabilizer 117 will be described below. FIG. 2 is a sectional view of the image stabilizer 117 excluding the image stabilization driving circuit 109.

A first yoke 401 is made of a magnetic material and screwed to a base plate 403. A first driving magnet 402 is a permanent magnet made of a neodymium magnet, and fixed to the first yoke 401 by a magnetic attraction through an opening provided in the base plate 403. A barrel 404 retains the image stabilizing lens 104 including lenses L11 and L12. The so-called camera shake can be corrected by moving the image stabilizing lens 104 in a plane orthogonal to the optical axis. A coil 405 is fixed to the barrel 404. A first guide plate 406 is screwed to the barrel 404. A second guide plate 407 is supported movably relative to the base plate 403 in a pitch axis direction via an unillustrated first rolling ball. The barrel 404 is supported movably relative to the second guide plate 407 in a yaw axis direction via an unillustrated second rolling ball. The barrel 404 is supported movably relative to the base plate 403 in a direction orthogonal to the optical axis via an unillustrated third rolling ball.

A second driving magnet 409 is fixed to a second yoke 408 by a magnetic attraction and positioned by a protrusion provided on the second yoke 408. The second yoke 408 is fixed by the magnetic attraction force generated between the first driving magnet 402 and the second driving magnet 409 so as to hold a prop relative to the first yoke 401. The first driving magnet 402 and the second driving magnet 409 are arranged so as to face the coil 405. A Lorentz force is generated in the first driving magnet 402 and the second driving magnet 409 when an electric current is supplied to the coil 405. When the Lorentz force is generated, the barrel 404 moves in a plane orthogonal to the optical axis. The coil 405, the first driving magnet 402, and the second driving magnet 409 are arranged in two orthogonal directions, respectively. Therefore, the barrel 404 can be freely moved within a predetermined range in a plane orthogonal to the optical axis by a combined force of the driving forces in the two directions.

A description will now be given of the magnetic noise reaching the image sensor 201. Since the magnitude of the magnetic noise is generally inversely proportional to the cube of the distance from the noise source, the farther the image sensor 201 is from the noise source, the smaller the noise influence on the image is. In this embodiment, the noise source is the coil 405.

Figure 3:
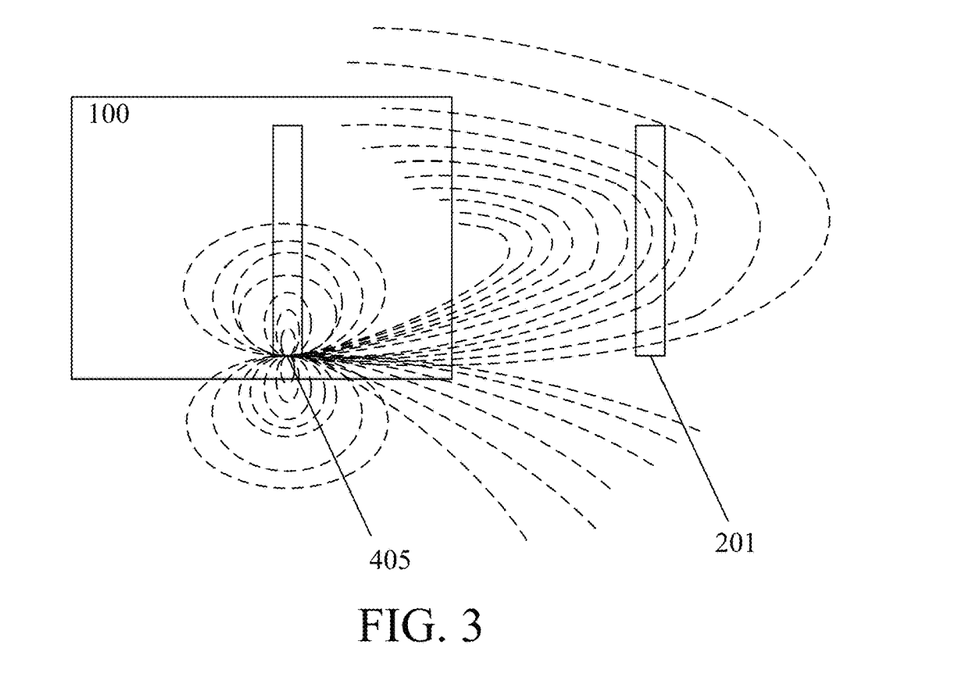
FIG. 3 illustrates a simulation result of a magnetic field generated from a coil during an image stabilization.

FIG. 3 illustrates a result of simulating the magnetic field generated from the coil 405 in the image stabilization by the image stabilizer 117. More specifically, the result of simulating a magnetic flux density changing amount when the current is changed at a high frequency (about several tens of kHz) flowing through the coil 405 is shown.

As illustrated in FIG. 3, the fluctuation of the magnetic field (magnetic flux density) generated when the current flows through the coil 405 for the image stabilization is generated at the position where the image sensor 201 is disposed. The image quality is deteriorated by the fluctuation of the magnetic field (magnetic flux density) at the position where the image sensor 201 is disposed. More specifically, a magnetic field that changes at a high frequency (about several tens of kHz) penetrates a signal line of pixel charge information for extracting an imaging signal from the image pickup apparatus 201. Thereby, the magnetism due to the electromagnetic induction is generated in the signal line, and as a result, the noise is generated in the signal line.

The noise component is also injected into the image data due to the external noises such as the magnetism, radio waves, and static electricity that enter the image sensor 201, and line noises and the like into the power supply and signal system supplied to the image sensor 201 and surrounding ICs. For example, when a motor close to the image sensor 201 operates during the photoelectric conversion, the magnetic noise of the motor itself and the current ripple noise due to the power supply at the startup may occur, which may affect the result of the photoelectric conversion. This influence is reflected in the image as a noise component.

Therefore, it is necessary to suppress the noise when the noise source and the image sensor 201 are close to each other and/or the noise source has a large noise amount. This embodiment suppress the noise by switching the driving control from the PWM control method to the linear control method.

Figure 4A:
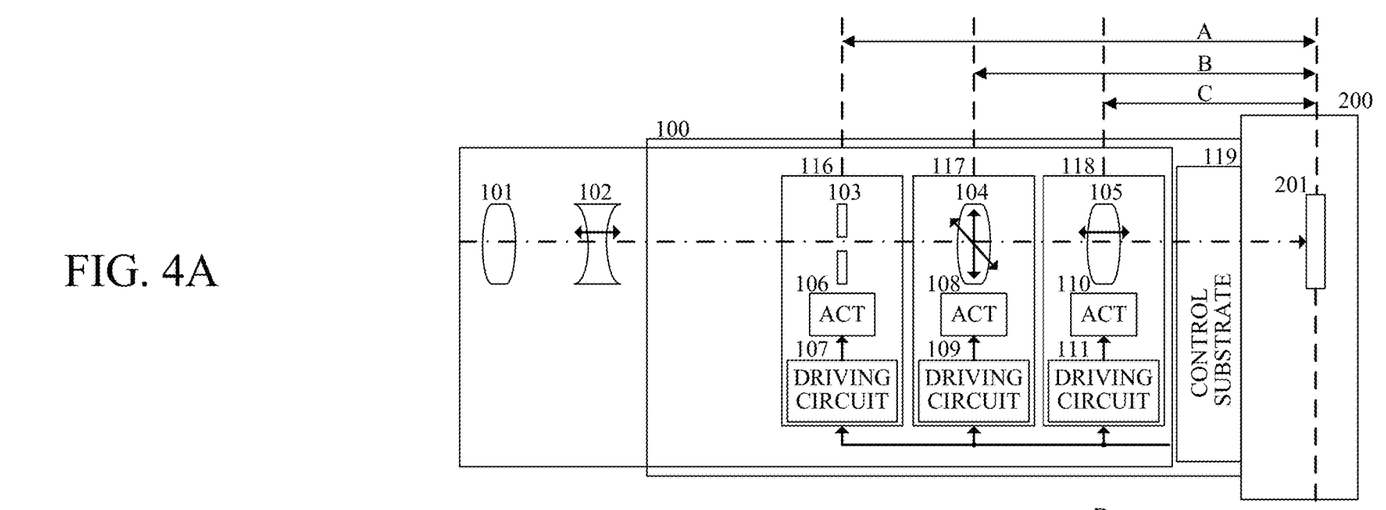
FIGS. 4A and 4B are sectional views of the camera system when an interchangeable lens is in a wide-angle state and a telephoto state.
Figure 4B:
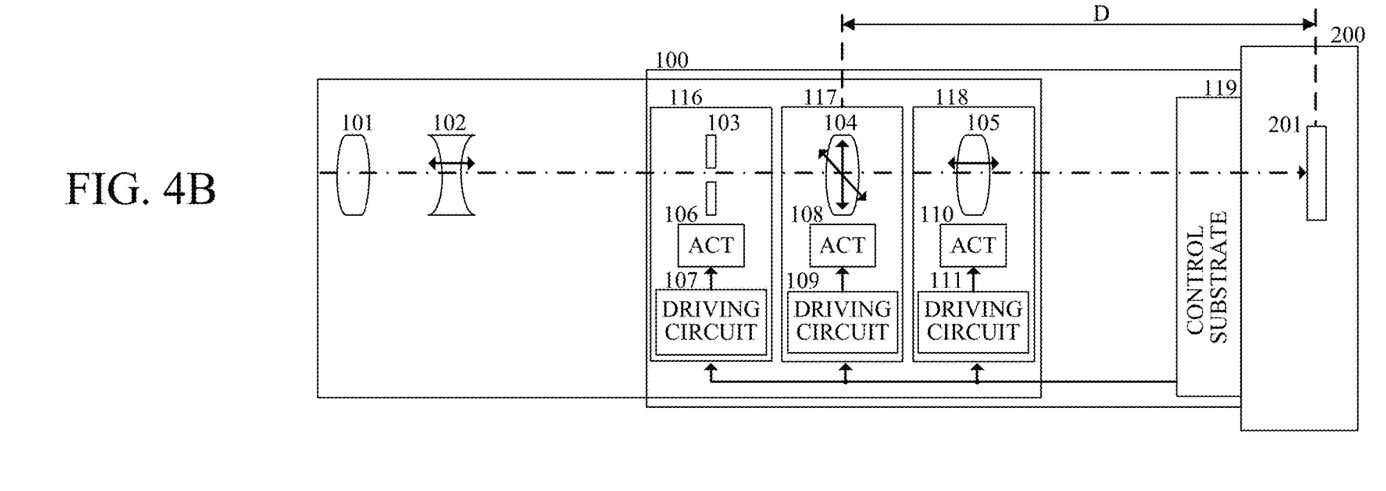

FIGS. 4A and 4B are sectional views of the camera system when the interchangeable lens 100 is in the wide-angle state and the telephoto state, respectively. The light amount adjuster 116, the image stabilizer 117, and the focusing unit 118 move along the optical axis when the cam ring is rotated by rotating an unillustrated zoom ring. The light amount adjuster 116, the image stabilizer 117, and the focusing unit 118 perform the ACT driving control by a control board 119 including the lens control CPU 112.

Figure 5:
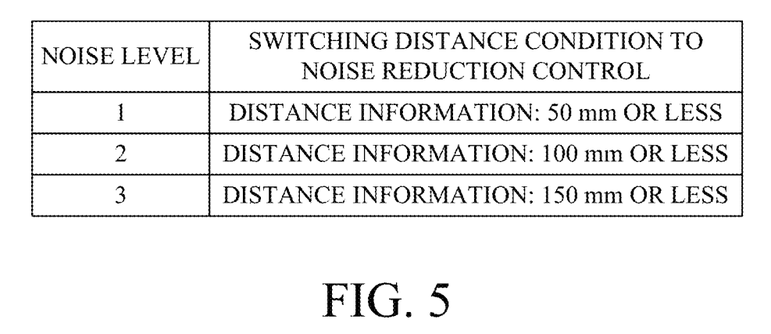
FIG. 5 illustrates an illustrative switching distance condition for switching to a noise reduction control for each noise level.

FIG. 5 illustrates an illustrative switching distance condition for a noise reduction control (control for reducing noises generated by THE noise source) for each noise level. In this embodiment, a noise level indicating the magnitude (influence degree) of the noise is set for each noise source.

In addition, information for determining a control over each driver (a switching distance condition for the noise reduction control in this embodiment) is set for each noise level. When the distance between the noise source and the image sensor 201 is equal to or less than a set distance, the noise reduction control is performed. As described above, this embodiment switches the control method from the PWM control method to the linear control method for the noise reduction control. This embodiment sets the noise level of the noise source based on the above simulation result, but the present invention is not limited to this example. It may be set based on the result of verifying the noise influence on the image sensor 201 with an actual machine, or it may be set for each individual product in the process inspection of the manufacturing factory.

This embodiment sets the noise level of the light amount adjuster 116 to 2, the noise level of the image stabilizer 117 to 3, and the noise level of the focusing unit 118 to 1. When a distance labelled "A" in FIG. 4A between the light amount adjuster 116 and the image sensor 201 is 160 mm, no noise reduction control is performed based on the switching distance condition to the noise reduction control for each noise level in FIG. 5. When a distance labelled "B" in FIG. 4A between the image stabilizer 117 and the image sensor 201 is 110 mm, the noise reduction control is performed based on the switching distance condition to the noise reduction control for each noise level in FIG. 5. When a distance labelled "C" in FIG. 4A between the focusing unit 118 and the image sensor 201 is 60 mm, no noise reduction control is performed based on the switching distance condition to the noise reduction control for each noise level in FIG. 5.

This embodiment switches the PWM control method to the linear control method for the noise reduction control, but the present invention is not limited to this example as long as the noise influence on the image can be reduced. Where the image and usability are not affected, the power supply to each driver may be stopped in order to stop driving or the supplied power may be reduced. The driving range may be limited in order to reduce the power supply.

Figure 6:
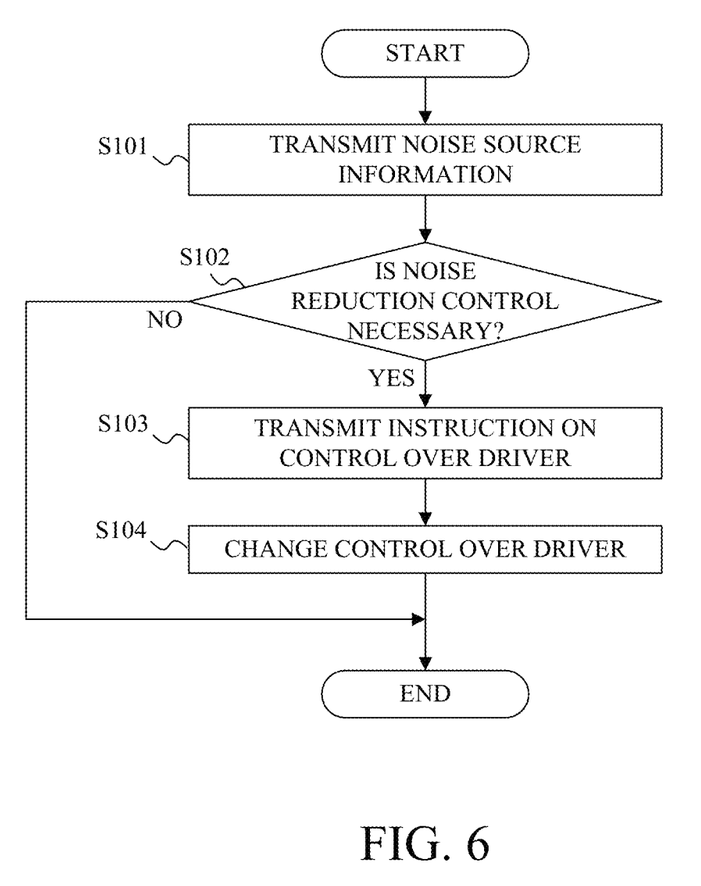
FIG. 6 is a flowchart showing processing of changing a control over a driver of the first embodiment.

FIG. 6 is a flowchart showing processing of changing the control over the driver according to this embodiment. This embodiment discusses a case where the interchangeable lens 100 is in a wide-angle state.

In the step S101, the lens control CPU 112 (noise source information transmitter 114) transmits the noise source information determined by using the simulation result, to the camera control CPU 206 (noise source information acquirer 208). The noise source information includes the noise level of the noise source, the switching distance condition to the noise reduction control, and the distance information between each noise source and the image sensor 201.

In the step S102, the camera control CPU 206 (lens ACT control method determiner 209) determines whether or not the noise reduction control is necessary using the noise source information acquired in the step S101. While this embodiment uses the distance information between each noise source and the image sensor 201 a determinant for which the noise reduction control is required, the present invention is not limited to this example. For example, if the ISO speed is increased, the noise component in the image increases. Therefore, information such as the ISO speed setting of the ISO speed adjuster 210 or the noise immunity strength against the noise sensitivity of the image sensor 201 itself may be used. Further, it may be determined that the noise reduction control is necessary when the imaging condition, such as the night imaging mode and the slow shutter-speed imaging, is set so that the noise influence on the image sensor 201 becomes large. If it is determined that the noise reduction control is necessary, the flow proceeds to the step S103, and otherwise this flow ends and a normal control follows.

In the step S103, the camera control CPU 206 transmits an instruction on the control over the driver to the lens control CPU 112.

In the step S104, the lens control CPU 112 (ACT control method changer 115) changes the control for the driver. This embodiment provides the noise reduction control. More specifically, the PWM control method effective for power saving is switched to the linear control method that generates no switching noise.

As described above, the configuration of this embodiment can reduce the noise caused by driving the actuator and can drive the actuator properly.

Second Embodiment

A camera system according to this embodiment has the same configuration as that of the first embodiment. This embodiment will discuss processing of changing the control over the driver when the distance information between each noise source and the image sensor 201 included in the noise information of the noise source is updated.

For example, as described in the first embodiment, when the distance labelled "B" in FIG. 4A between the image stabilizer 117 and the image sensor 201 is 110 mm, the noise reduction control is performed. Thereafter, the zoom ring is rotated, the interchangeable lens 100 changes from the wide-angle state illustrated in FIG. 4A to the telephoto state illustrated in FIG. 4B, and the distance information between the image stabilizer 117 and the image sensor 201 is updated. At this time, when a distance labelled "D" in FIG. 4B between the image stabilizer 117 and the image sensor 201 is 160 mm, the distance between the light amount adjuster 116 and the image sensor 201 is not 150 mm or less and thus the control method is switched from the linear control method to the PWM control method.

The distance information between the image sensor 201 and the noise source is updated by the rotating operation of the zoom ring, and transmitted from the noise source information transmitter 114 to the camera control CPU 206. In this embodiment, the distance information is updated and transmitted when the zoom ring reaches the wide-angle or telephoto end (when the driven member reaches the end of the movable range), but the present invention is not limited to this example. For example, the distance information may be updated and transmitted at predetermined intervals while the zoom ring is rotated. The distance information may be updated and transmitted each time the operation of the zoom ring is stopped, or may be updated and transmitted when the noise source becomes closest to the image sensor 201 by the operation of the zoom ring. The distance information may be updated and transmitted when the distance between the position the noise source closest to the image sensor 201 and the current position of the noise source when the operation of the zoom ring is stopped becomes a predetermined value or more.

Figure 7:
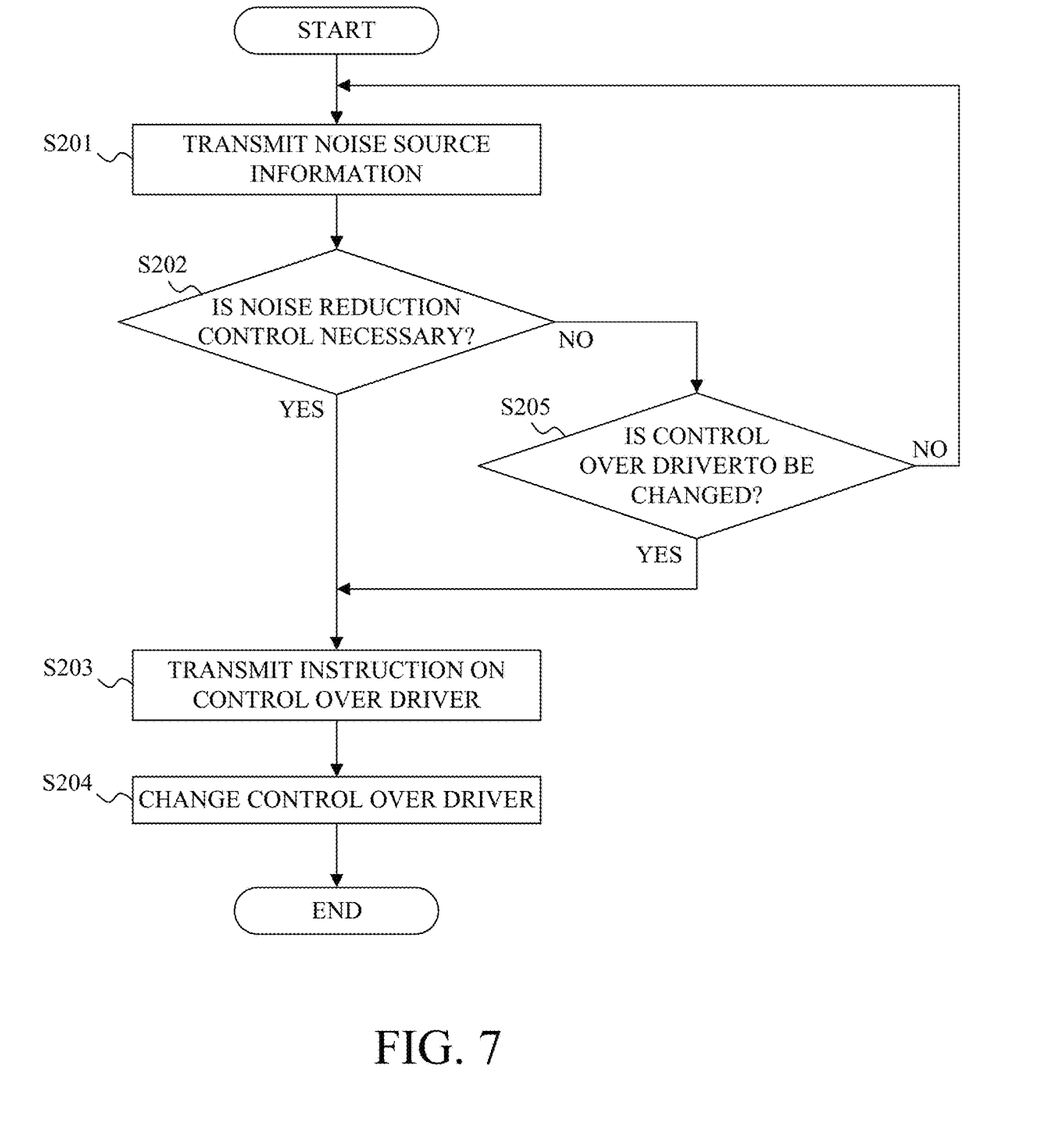
FIG. 7 is a flowchart showing processing of changing a control over a driver when distance information between each noise source and the image sensor according to a second embodiment.

FIG. 7 is a flowchart showing processing of changing the control over the driver when the distance information between each noise source and the image sensor 201 included in the noise source information is updated.

In the step S201, the lens control CPU 112 (noise source information transmitter 114) transmits the noise source information determined from the simulation result, to the camera control CPU 206 (noise source information acquirer 208). The noise source information includes the noise level of the noise source, the switching distance condition to the noise reduction control, and the distance information between each noise source and the image sensor 201.

In the step S202, the camera control CPU 206 (lens ACT control method determiner 209) determines whether or not the noise reduction control is necessary using the noise source information acquired in the step S201. If it is determined that the noise reduction control is necessary, the flow proceeds to the step S203, and otherwise the flow proceeds to the step S205.

In the step S203, the camera control CPU 206 transmits an instruction on the control over the driver to the lens control CPU 112.

In the step S204, the lens control CPU 112 (ACT control method changer 115) changes the control over the driver.

In the step S205, the camera control CPU 206 (lens ACT control method determiner 209) determines whether it is necessary to change the control over the driver. In this embodiment, the lens ACT control method determiner 209 selects either the PWL control method effective for power saving or the linear control method that generates no switching noise. If it is determined that the control over the driver is to be changed, the flow proceeds to the step S203, and otherwise the flow returns to the step S201.

As described above, the configuration of this embodiment can reduce the noise caused by driving the actuator and can drive the actuator properly.

Third Embodiment

Figure 8:
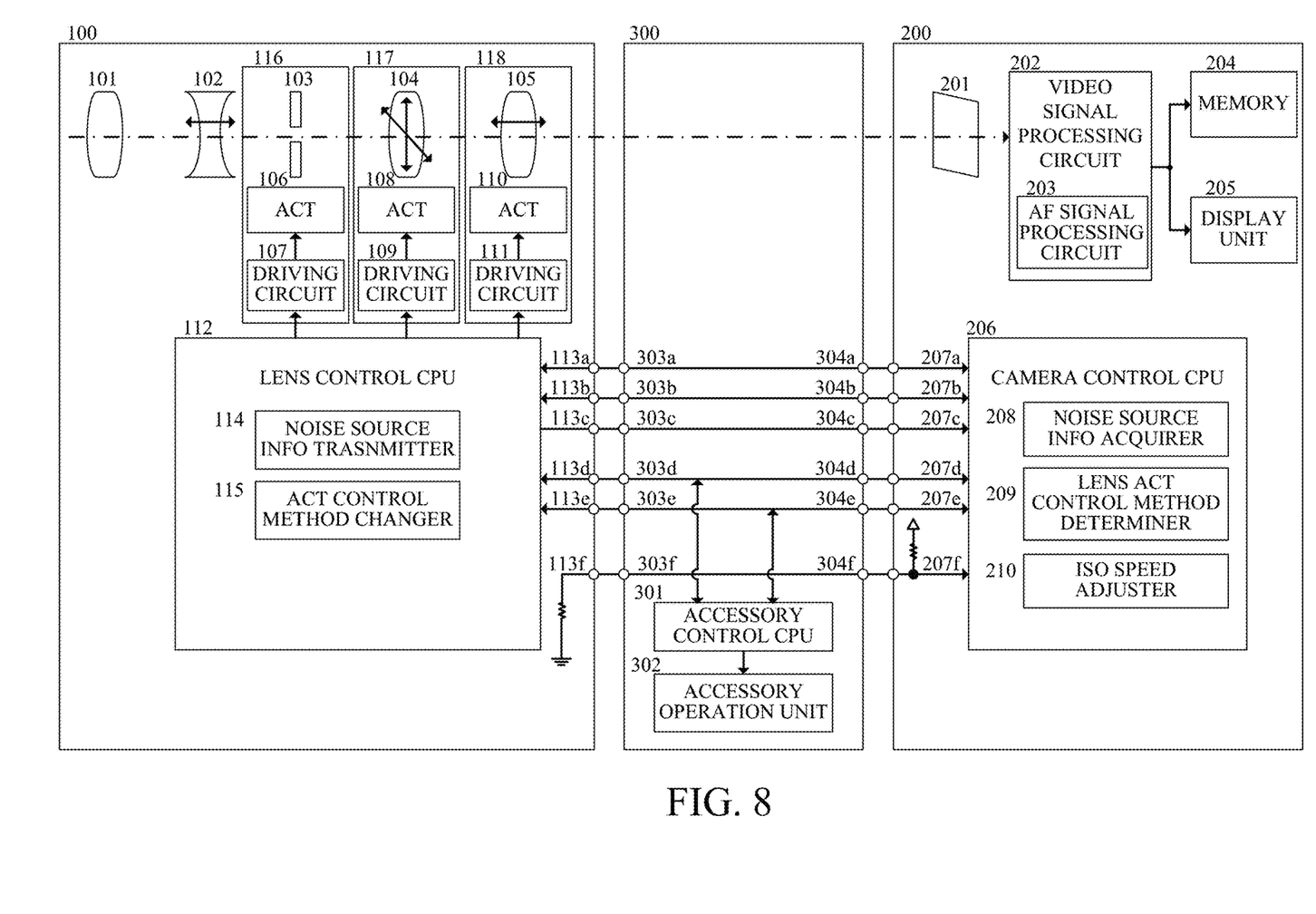
FIG. 8 is a configuration diagram of a camera system according to a third embodiment.

FIG. 8 is a configuration diagram of a camera system according to this embodiment. The camera system includes a lens apparatus (interchangeable lens hereinafter) 100 and an image pickup apparatus (camera body hereinafter) 200 mountable (attachable) with the interchangeable lens 100 detachably and communicably. The camera system further includes an accessory 300 that is attachable between the interchangeable lens 100 and the camera body 200. In this embodiment, the accessory 300 is an intermediate accessory mounted between the interchangeable lens 100 and the camera body 200, but the present invention is not limited to this embodiment. In this embodiment, a description of the configuration common to that of the first and second embodiments will be omitted.

When the interchangeable lens 100 is attached to the camera body 200 via the accessory 300, the electrical contacts 113a, 113b, and 113c provided on the interchangeable lens 100 are connected to electrical contacts 303a, 303b, and 303c provided on the accessory 300, respectively. In addition, electrical contacts 304a, 304b, and 304c provided on the accessory 300 are connected to the electrical contacts 207a, 207b, and 207c provided on the camera body 200, respectively. Thereby, various information can be communicated between the interchangeable lens 100 and the camera body 200. FIG. 8 illustrates a three-wire serial communication, but the present invention is not limited to this example. In this embodiment, the lens control CPU 112 and the camera control CPU 206 perform the serial communication using the camera control CPU 206 as a clock master.

When the interchangeable lens 100 is attached to the camera body 200 via the accessory 300, electrical contacts 113d and 113e provided on the interchangeable lens 100 are connected to electrical contacts 303d and 303e provided on the accessory 300, respectively. Further, electrical contacts 304*d* and 304*e* provided on the accessory 300 are connected to electrical contacts 207*d* and 207*e* provided on the camera body 200, respectively. Thereby, various information can be communicated between the interchangeable lens 100 and the accessory 300, between the camera body 200 and the accessory 300, and between the interchangeable lens 100 and the camera body 200. FIG. 8 illustrates a two-wire serial communication, but the present invention is not limited to this example. In this embodiment, the lens control CPU 112, the accessory control CPU 301, and the camera control CPU 206 perform a serial communication using the camera control CPU 206 as a clock master.

The interchangeable lens 100 and the accessory 300 save, as unique information, optical information (focal length, F-number (aperture value), focus sensitivity, focus correction amount, etc.) and characteristic information, and transmit this information to the camera body 200. When the accessory 300 is attached to the interchangeable lens 100, the characteristic information of the accessory 300 is transmitted to the camera body 200. The "optical information" means optically unique information (focus lens sensitivity, focus correction amount information, etc.) that changes according to states such as zooming, focusing, and F-number. The "characteristic information" basically means unique information that does not change depending on the states, such as the ID information (lens ID, accessory ID, etc.) for identifying the model and serial number, the maximum communication speed, open F-number, whether it is a zoom lens, whether autofocus (AF) is available, an image height, a power mode, and accessory dimension information. Similarly, the interchangeable lens 100 receives unique information (accessory ID, accessory power information, accessory dimension information, etc.) of the camera body 200 and the accessory 300.

An accessory operation unit 302 is a processing circuit unit of an operation ring that allows the user to uniquely assign a variable function of the ISO speed and the F-number.

Electrical contacts 113*f*, 207*f*, 303*f*, and 304*f* are terminals for discriminating the type of the accessory 300 mounted on the camera body 200. The electrical contact 207*f* is pulled up in the camera body 200 via a resistor to the same voltage as the unillustrated power supply voltage supplied to the camera control CPU 206. The electrical contact 113*f* is pulled down to the ground via a resistor in the interchangeable lens 100. The camera control CPU 206 can detect a voltage value of the electrical contact 207*f*, and determine the type of the accessory 300 mounted on the camera body 200 based on the detected voltage value. That is, the camera control CPU 206 serves as a determiner (or discriminator) configured to determine (or discriminate) the type of the attached accessory 300. The accessory 300 may be identified by the communications among the accessory control CPU 301, the camera control CPU 206, and the lens control CPU 112. The accessory 300 may be discriminated by changing a voltage division ratio of the voltage detected by the camera control CPU 206 by adding a pull-down resistor to the accessory 300.

Figure 9A:
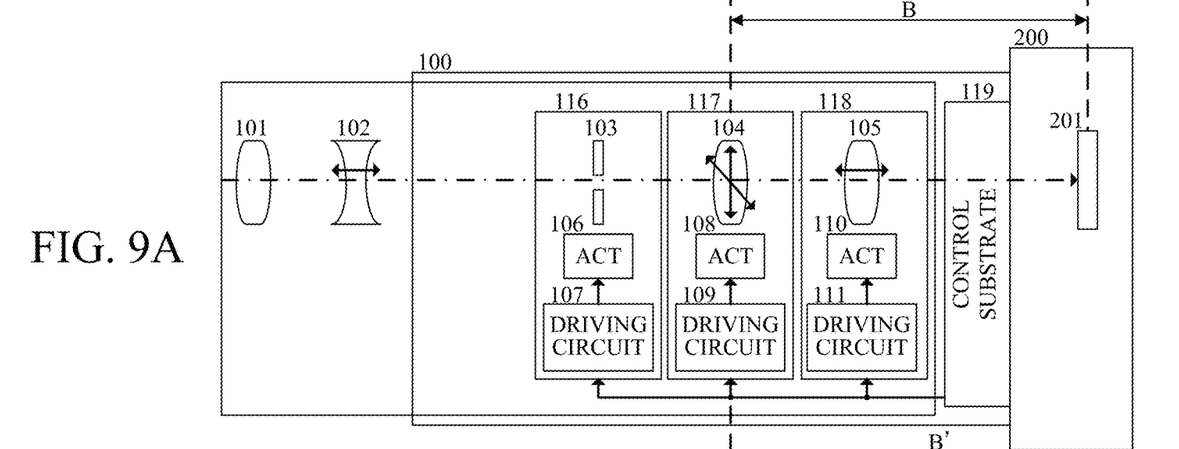
FIGS. 9A and 9B are sectional views of the camera system according to the third embodiment.
Figure 9B:
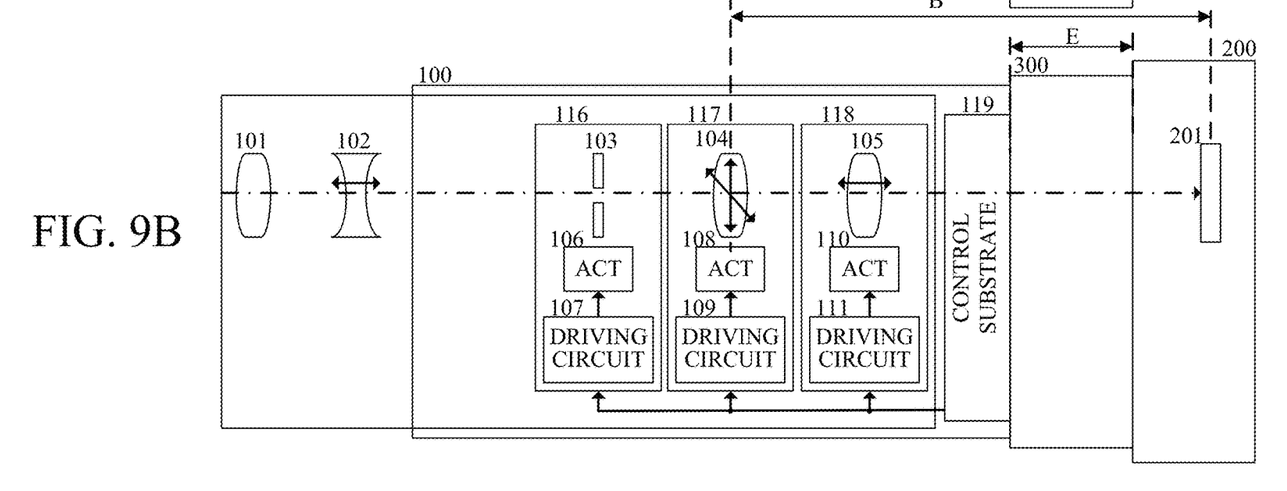

FIGS. 9A and 9B are sectional views of the camera system according to this embodiment. FIG. 9A illustrates the camera system in which the accessory 300 is not connected and the interchangeable lens 100 is in the wide-angle state, that is, in the state of FIG. 4A. FIG. 9B illustrates the camera system in which the accessory 300 is connected between the interchangeable lens 100 and the camera body 200, and the interchangeable lens 100 is in a wide-angle state.

This embodiment sets the noise level of the image stabilizer 117 to 3. When a distance labelled "B" in FIG. 9A between the image stabilizer 117 and the image sensor 201 is 110 mm, the noise reduction control is performed based on the switching distance condition to the noise reduction control for each noise level in FIG. 5. For the noise reduction control, this embodiment switches the control method from the PWM control method effective for power saving to the linear control method that generates no switching noise.

While this embodiment switches the control method from the PWM control method to the linear control method for the noise reduction control, the present invention is not limited to this example as long as the noise influence on the image can be reduced. Where the image and usability are not affected, the power supply to each driver may be stopped in order to stop driving or the supplied power may be reduced. Further, the driving range may be limited in order to reduce the power supply.

In the configuration of FIG. 9B, the overall length labelled "E" in FIG. 9B of the accessory 300 is 50 mm. At this time, when a distance labelled "B'" in FIG. 9B between the image stabilizer 117 and the image sensor 201 via the accessory 300 is 160 mm, no noise reduction control is performed based on the switching distance condition to the noise reduction control for each noise level in FIG. 5.

Figure 10:
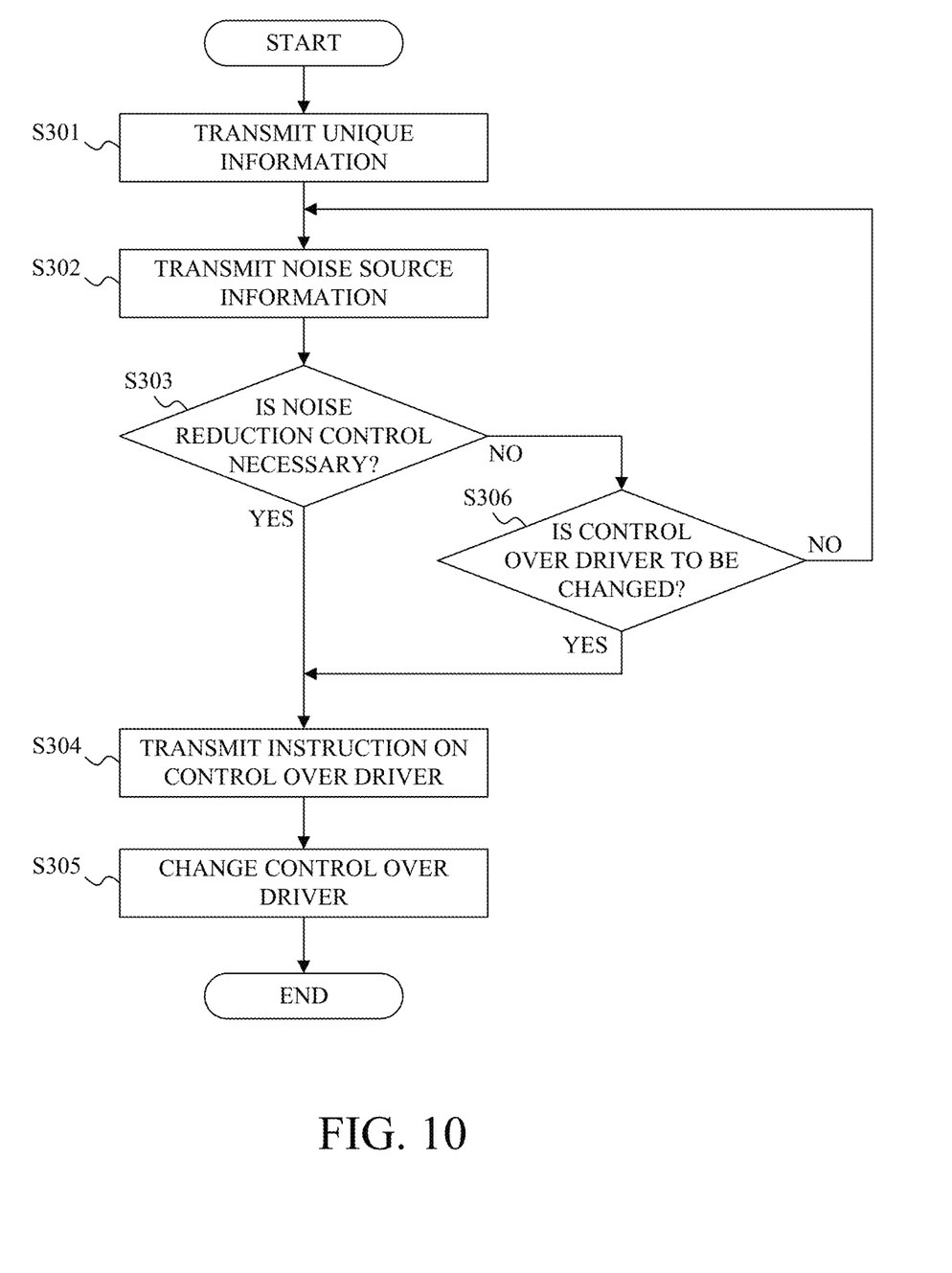
FIG. 10 is a flowchart showing processing of changing a control over a driver where an accessory is attached between an interchangeable lens and a camera body in the third embodiment.

FIG. 10 is a flowchart showing processing of changing the control over the driver when the accessory 300 is connected to the interchangeable lens 100 and the camera body 200.

In the step S301, the accessory control CPU 301 transmits the unique information of the accessory 300 including the accessory dimension information to the camera control CPU 206. In this embodiment, the unique information is transmitted from the accessory control CPU 301 to the camera control CPU 206, but may be transmitted from the accessory control CPU 301 to the lens control CPU 112 and then transmitted from the lens control CPU 112 to the camera control CPU 206. That is, the unique information may be transmitted to at least one of the camera control CPU 206 and the lens control CPU 112.

In the step S302, the lens control CPU 112 (noise source information transmitter 114) transmits the noise source information determined from the simulation result, to the camera control CPU 206 (noise source information acquirer 208). The noise source information includes the noise level of the noise source, the switching distance condition to the noise reduction control, and the distance information between each noise source and the image sensor 201.

In the step S303, the camera control CPU 206 (lens ACT control method determiner 209) determines whether or not the noise reduction control is necessary using the unique information acquired in the step S301 and the noise information acquired in the step S302. If it is determined that the noise reduction control is necessary, the flow proceeds to the step S304, and otherwise the flow proceeds to the step S206.

In the step S304, an instruction on the control over the driver is transmitted to the lens control CPU 112.

In the step S305, the lens control CPU 112 (ACT control method changer 115) changes the control over the driver.

In the step S306, the camera control CPU 206 (lens ACT control method determiner 209) determines whether it is necessary to change the control over the driver. In this embodiment, the lens ACT control method determiner 209 selects either the PWM control method effective for power saving or the linear control method that generates no switching noise. If it is determined that the control over the driver is to be changed, the flow proceeds to the step S304, and otherwise the flow returns to the step S301.

As described above, the configuration of this embodiment can reduce the noise caused by driving the actuator and can drive the actuator properly.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Each embodiment can provide an image pickup apparatus, a lens apparatus, and a camera system, each of which can reduce noises caused by driving an actuator and can properly drive the actuator.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-078160, filed on Apr. 27, 2020 which is hereby incorporated by reference herein in its entirety.

What is claimed is:

1. An image pickup apparatus communicably mountable with a lens apparatus including a driver configured to drive a driven member, the image pickup apparatus comprising:
an acquirer configured to acquire information on a magnetic noise source; and
a determiner configured to determine a control over the driver using the information on the magnetic noise source,
wherein when distance information from an image sensor to the magnetic noise source changes from first distance information to second distance information in a case where the driven member moves from a first position, corresponding to the first distance information, to a second position, corresponding to the second distance information, in an optical axis direction, the acquirer acquires from the lens apparatus the distance information that has been changed.

2. The image pickup apparatus according to claim 1, wherein the acquirer acquires the information on the magnetic noise source from the lens apparatus.

3. The image pickup apparatus according to claim 1, further comprising a memory configured to store the information on the magnetic noise source for the lens apparatus,
wherein the acquirer acquires identification information of the lens apparatus from the lens apparatus, and the information on the magnetic noise source corresponding to the identification information from the memory.

4. The image pickup apparatus according to claim 1, wherein the acquirer acquires the identification information of the lens apparatus from the lens apparatus and the information on the magnetic noise source corresponding to the identification information from an external device.

5. The image pickup apparatus according to claim 1, wherein the information on the magnetic noise source includes at least one of distance information from an image sensor to the magnetic noise source, information on a noise level of the magnetic noise source, and information for determining the control over the driver.

6. The image pickup apparatus according to claim 1, wherein the determiner determines a control for reducing a noise generated by the magnetic noise source as the control over the driver.

7. The image pickup apparatus according to claim 6, wherein the control for reducing the noise includes at least one of a change in a control method for the driver, a control for reducing a power supplied to the driver, and a stop of a power supply to the driver.

8. The image pickup apparatus according to claim 7, wherein the control method for the driver includes a pulse width modulation control method and a linear control method.

9. The image pickup apparatus according to claim 1, wherein the acquirer acquires the distance information from the lens apparatus when the magnetic noise source becomes closest to the image sensor.

10. The image pickup apparatus according to claim 1, wherein when the distance information changes at predetermined intervals, the acquirer acquires the distance information from the lens apparatus at the predetermined intervals.

11. The image pickup apparatus according to claim 1, wherein the acquirer acquires the distance information from the lens apparatus when the driven member stops.

12. The image pickup apparatus according to claim 1, wherein the acquirer acquires the distance information from the lens apparatus when the driven member reaches an end of a movable range.

13. The image pickup apparatus according to claim 1, wherein the acquirer acquires the distance information from the lens apparatus when a distance between a position of the magnetic noise source that is closest to an image sensor and a current position of the magnetic noise source is equal to or greater than a predetermined value.

14. The image pickup apparatus according to claim 1, wherein the image pickup apparatus is communicably mountable with an accessory, and
wherein the determiner determines the control over the driver using the information on the magnetic noise source and information on the accessory.

15. The image pickup apparatus according to claim 14, wherein the information on the accessory is transmitted from the accessory to at least one of the image pickup apparatus and the lens apparatus.

16. A lens apparatus communicably mountable on an image pickup apparatus, the lens apparatus comprising:

a driver configured to drive a driven member;

a transmitter configured to transmit information on the lens apparatus to the image pickup apparatus; and a controller configured to control driving of the driver using an instruction from the image pickup apparatus on a control over the driver based on information on a magnetic noise source, wherein when distance information from an image sensor to the magnetic noise source changes from first distance information to second distance information in a case where the driven member moves from a first position, corresponding to the first distance information, to a second position, corresponding to the second distance information, in an optical axis direction, the transmitter transmits the distance information that has been changed to the image pickup apparatus.

17. A camera system comprising:

an image pickup apparatus communicably mountable with a lens apparatus; and a lens apparatus that includes a driver configured to drive a driven member, a transmitter configured to transmit information on the lens apparatus to the image pickup apparatus, and a controller configured to control driving of the driver using an instruction from the image pickup apparatus on a control over the driver based on information on a magnetic noise source, wherein the image pickup apparatus includes an acquirer configured to acquire the information on the magnetic noise source, and a determiner configured to determine the control over the driver using the information on the magnetic noise source, wherein when distance information from an image sensor to the magnetic noise source changes from first distance information to second distance information in a case where the driven member moves from a first position, corresponding to the first distance information, to a second position, corresponding to the second distance information, in an optical axis direction, the acquirer acquires from the lens apparatus the distance information that has been changed.

* * * * *